US008781635B2

(12) United States Patent
Greenlee

(10) Patent No.: US 8,781,635 B2
(45) Date of Patent: Jul. 15, 2014

(54) EQUIPMENT CONDITION AND PERFORMANCE MONITORING USING COMPREHENSIVE PROCESS MODEL BASED UPON MASS AND ENERGY CONSERVATION

(75) Inventor: Terrill L. Greenlee, Encinitas, CA (US)

(73) Assignee: Invensys Systems, Inc., Foxboro, MA (US)

( * ) Notice: Subject to any disclaimer, the term of this patent is extended or adjusted under 35 U.S.C. 154(b) by 198 days.

(21) Appl. No.: 12/904,009

(22) Filed: Oct. 13, 2010

(65) Prior Publication Data

US 2012/0095574 A1 Apr. 19, 2012

Related U.S. Application Data

(63) Continuation of application No. 10/305,657, filed on Nov. 26, 2002, now abandoned.

(60) Provisional application No. 60/338,052, filed on Nov. 30, 2001.

(51) Int. Cl.
*G05D 7/00* (2006.01)
*G05B 13/02* (2006.01)

(52) U.S. Cl.
USPC ................................ 700/282; 700/29; 700/31

(58) Field of Classification Search
USPC ........................................ 700/29, 31, 33, 282
See application file for complete search history.

(56) References Cited

U.S. PATENT DOCUMENTS

| | | | |
|---|---|---|---|
| 5,260,865 A | 11/1993 | Beauford et al. | |
| 5,402,333 A | 3/1995 | Cardner | |
| 5,486,995 A | 1/1996 | Krist et al. | |
| 5,504,692 A | 4/1996 | Cardner | |
| 6,038,540 A | 3/2000 | Krist et al. | |
| 6,158,220 A | 12/2000 | Hansen et al. | |
| 6,167,705 B1 | 1/2001 | Hansen et al. | |
| 6,263,675 B1 | 7/2001 | Hansen et al. | |
| 6,278,962 B1 | 8/2001 | Klimasauskas et al. | |
| 6,323,882 B1 | 11/2001 | Jerome et al. | |

FOREIGN PATENT DOCUMENTS

| | | |
|---|---|---|
| EP | 1052558 A1 | 11/2000 |
| WO | 0042297 A1 | 7/2000 |
| WO | WO 03/048876 * 6/2003 ............. G05B 13/02 |

OTHER PUBLICATIONS

EP Application EP02789925.1 Supplemental European Search Report mailed Jan. 14, 2005.
EP Application EP02789925.1 Office Action mailed Feb. 23, 2006.
EP Application EP02789925.1 Office Action mailed Oct. 24, 2007.

(Continued)

*Primary Examiner* — Sean Shechtman
(74) *Attorney, Agent, or Firm* — Edward S. Jarmolowicz, Esq.

(57) ABSTRACT

A method and apparatus capable of monitoring performance of a process and of the condition of equipment units effecting such process is disclosed. A process model predicated upon mass and energy balancing is developed on the basis of a plurality of generally nonlinear models of the equipment units. At least one or more of such equipment models are characterized by one or more adjustable maintenance parameters. Data relating to mass and energy transfer within the process is collected and is reconciled with the mass and energy characteristics of the process predicted by the model. The condition of the equipment units and process performance may then be inferred by monitoring the values of the maintenance parameters over successive data reconciliation operations.

17 Claims, 13 Drawing Sheets

(56) References Cited

OTHER PUBLICATIONS

PCT Application PCT/US2002/38176 International Search Report mailed Mar. 27, 2003.

U.S. Appl. No. 10/305,657 Non-Final Rejection Apr. 6, 2007.
U.S. Appl. No. 10/305,657 Non-Final Rejection May 14, 2008.
U.S. Appl. No. 10/305,657 Final Rejection Feb. 13, 2009.
U.S. Appl. No. 10/305,657 Non-Final Rejection Sep. 1, 2009.
U.S. Appl. No. 10/305,657 Final Rejection Apr. 13, 2010.

* cited by examiner

EQUIPMENT CONDITION AND PERFORMANCE MONITORING USING COMPREHENSIVE PROCESS MODEL BASED UPON MASS AND ENERGY CONSERVATION

CROSS-REFERENCE TO RELATED APPLICATIONS

This application is a continuation of and claims priority under 35U.S.C. §120to U.S. patent application Ser. No. 10/305,657, filed Nov. 26, 2002, which claims priority under 35 U.S.C. §119(e) to U.S. Provisional Patent Application No. 60/338,052, filed Nov. 30, 2001, which is incorporated by reference herein in its entirety.

FIELD OF THE INVENTION

The present invention relates to the field of equipment condition and process performance monitoring and, in particular, to systems and methods for monitoring such condition and performance using data reconciliation techniques predicated upon mass and energy conservation.

BACKGROUND OF THE INVENTION

Complex industrial systems such as, for example, power generation systems and chemical, pharmaceutical and refining processing systems, have experienced a need to operate ever more efficiently in order to remain competitive. This need has resulted in the development and deployment of process modeling systems. These modeling systems are used to construct a process model, or flowsheet, of an entire processing plant using equipment or component models provided by the modeling system. These process models are used to design and evaluate new processes, redesign and retrofit existing process plants, and optimize the operation of existing process plants.

Existing flowsheet modeling techniques have been directed to discrete units of plant equipment, rather than to entire plant processes. In certain approaches the operation of individual items of plant equipment predicted by a flowsheet model is attempted to be reconciled with measurements of the equipment's actual operation. Data relating to such actual operation is typically acquired by flow sensors and the like positioned on or near the item of equipment. Such flow sensors vary in their accuracy depending on the material in the stream being monitored, the condition of the stream, and the specific sensing technology employed within the flow sensor. Moreover, the performance of flow sensors may be degraded by obstructions, wear or outright failure. The attendant inaccuracies in the operational data produced by the flow sensors may corrupt the reconciliation of such data with the equipment performance predicted by the flowsheet model, thereby resulting in undesirable erroneous predictions or process control adjustments.

The data reconciliation process often involves minimization of the sum of squared errors between predicted and measured operational parameters. However, the relative accuracy of the sensors used in deriving the error terms is generally not taken into account, which tends to introduce inaccuracies into the reconciliation process. That is, a sensor whose behavior changes due to failure or deterioration may cause incorrect adjusted estimates to be attributed to related sensors during the reconciliation process. Since conventional flowsheet models are not predicated upon operation of entire plant processes, it can be difficult to gauge when predicted operation of individual equipment is inconsistent with realistic operation of an overall process.

Equipment condition has also been attempted to be monitored using flowsheet models directed to individual units of equipment. However, it is generally difficult to determine whether a change in output or other monitored parameter of an individual unit of equipment is properly attributed to a change in the equipment itself or to a change in the applicable process "upstream" of the equipment unit.

In the field of power generation systems, this limitation of existing modeling techniques has proven to be particularly undesirable as concerns with deregulation and operational costs have resulted in efforts to improve system reliability and performance. As is well known, the Rankine cycle power plant, which typically utilizes water as the processed fluid, has been pervasive in the power generation industry for many years. In a Rankine cycle power plant, electrical energy is derived from heat energy through the heating of the processed fluid as it travels through tubular walls and thereby forms a vapor. The vapor is generally superheated to form a high pressure vapor, which is input to a turbine generator to produce electricity.

Other improvements in the efficiency of Rankine cycle power systems have been achieved through technological enhancements, which have enabled the temperatures and pressures of processed fluids to be increased. When reconciliation techniques such as those described above are employed to monitor the performance of such power systems, such techniques are often applied to individual units of equipment or indicia of performance (e.g., turbine efficiency). A dramatic change in such indicia signals that the applicable unit(s) of equipment may be not be operating properly. Again, however, such approaches are premised upon models of only subsets of the equipment utilized in the overall power generation process, and thus are not subject to the constraints which could be imposed upon the Rankine cycle of the process. This makes such approaches inherently uncertain, because it will not be known whether changes in monitored parameters of isolated equipment units are due to equipment degradation or to changes in upstream conditions.

SUMMARY OF THE INVENTION

In general, the present invention relates to a method and apparatus capable of monitoring performance of a process and of the condition of equipment units effecting such process. A process model predicated upon mass and energy balancing is developed on the basis of a plurality of generally nonlinear models of the equipment units. At least one or more of such equipment models are characterized by one or more adjustable maintenance parameters. As is described below, data relating to mass and energy transfer within the process is collected and is reconciled with the mass and energy characteristics of the process predicted by the model. In accordance with one aspect of the invention, the condition of the equipment units and process performance may be inferred by monitoring the values of the maintenance parameters over successive data reconciliation operations.

In a particular aspect the present invention relates to a method for monitoring the condition of a plurality of units of equipment used to effect a process involving one or more resource flows of mass and energy. The method includes measuring one or more quantities related to the resource flows (e.g., temperature, pressure, flow rate) in order to generate respective first and second measured resource flows. A model of the process is formulated so as to include a plurality of generally nonlinear equipment models corresponding to the plurality of units of equipment, wherein at least a first of the nonlinear equipment models includes a first maintenance parameter. A value of at least the first maintenance parameter is adjusted such that predictions of the flow rates are reconciled with the first and second measured resource flows. In addition, changes in the value of the first maintenance parameter are adjusted over time in order to enable detection of changes in the condition of at least one of the plurality of units of equipment.

In another aspect, the present invention relates to a method of processing signals representative of a process effected by one or more equipment units in operative communication through one or more resource flows. The method includes measuring flow rates of at least first and second of the resource flows in order to generate respective first and second measured resource flow signals. A model of the process is formulated based upon conservation of a process parameter characterizing the first and second resource flows, wherein the model includes at least a first maintenance parameter. The method further contemplates adjusting a first value of the first measured resource flow signal, a second value of the second measured resource flow signal, and the first maintenance parameter such that the process parameter is conserved consistent with the model.

BRIEF DESCRIPTION OF THE DRAWINGS

For a better understanding of the nature of the features of the invention, reference should be made to the following detailed description taken in conjunction with the accompanying drawings, in which.

DETAILED DESCRIPTION OF THE INVENTION

Figure 1:
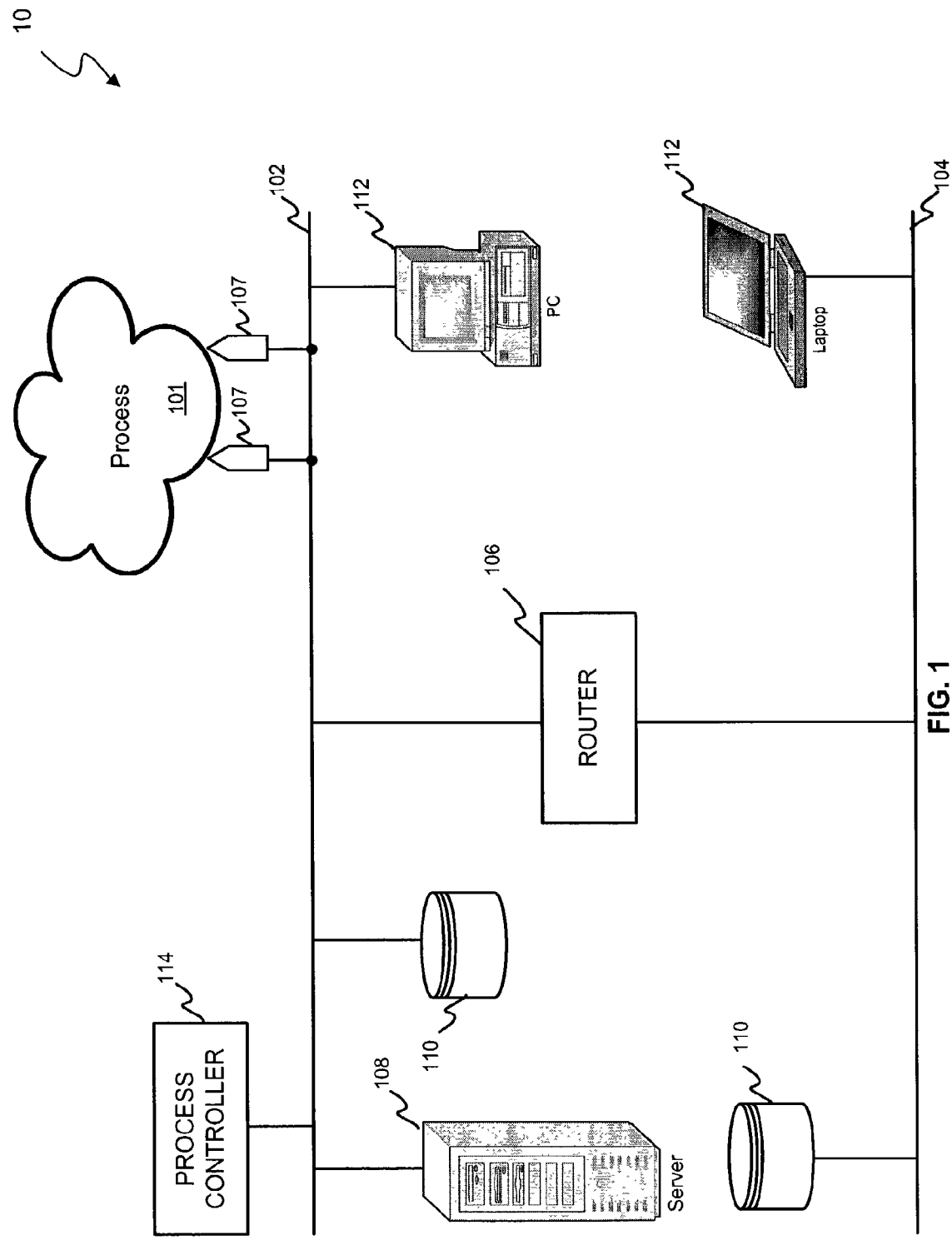
FIG. 1 illustratively represents the network architecture of a system within which one embodiment of the present invention may be incorporated.

FIG. 1 illustratively represents the network architecture of a system 100 within which one embodiment of the present invention may be incorporated. The system operates on a process 101, which may comprise any process including, without limitation, chemical processes, energy processes and distribution processes. In the case of a process 101 geared toward power generation, the math model will preferably reflect the Rankine cycle of the power generation operation. In implementations involving chemical and other processes, the material in the process can be treated as a fluid that is moved within the process in streams. A process is normally made up of more than one unit of equipment, where each unit carries out some specific processing function, such as reaction, distillation, or heat exchange. Equipment units are interconnected and/or in fluid communication via streams. A plurality of plant sensors 107 are selected and configured to measure values of the regulatory variables applicable to the equipment units used to perform the process 101. These regulatory variables, e.g., pressure, temperature, level, and flow, are controlled to maintain process equipment operating at a designated stationary state. These variables may also be adjusted by the operator to move the process equipment to another stationary state (e.g., to increase production).

As is described below, in one aspect the method of the present invention contemplates reconciling predicted operation of an entire plant process and data measured by plant sensors 107. In this regard the inventive method forces reconciliation of such measured plant data and predicted operational data derived from a comprehensive model of the entire plant process based upon generally nonlinear models of individual units of equipment. Each such nonlinear model is characterized by one or more parameters, some or all of which are designated as maintenance parameters. The maintenance parameters associated with the model of a particular unit of equipment will generally be selected so as to be reflective of the "health" or operational soundness of the equipment unit. For example, one of the maintenance parameters for a heat-exchanger could be a heat transfer coefficient while one of the maintenance parameters for a pump could be a pump curve scaling factor.

In an exemplary embodiment reconciliation between the plant operation predicted by the comprehensive plant model and the measured plant data is effected so as to establish an overall mass and energy balance. This approach is believed to be different from prior techniques, which have tended to be confined to optimization of discrete portions of an overall plant process without regard to maintenance of overall mass and energy balance. In an exemplary embodiment, the result of the reconciliation process of the present invention transforms the signals generated by the plant sensors into corrected measurement signals and adjusts the values of maintenance parameters within predefined ranges based upon estimated equipment variances. Such simultaneous modification of both measured values and maintenance parameters over an entire process is believed to represent a significant departure from prior reconciliation techniques.

It has also been found that the changes in maintenance parameters across successive reconciliation operations may provide an indication of the condition of the equipment unit with which the maintenance parameter is associated. Such monitoring of maintenance parameters over time is believed to represent a novel approach to gauging equipment condition. This approach is facilitated by utilization of a comprehensive plant model comprised of a set of generally nonlinear models of individual equipment models. Prior modeling techniques involving only a portion of a plant process would not enable meaningful information to be gleaned from such monitoring of maintenance parameters over time, since it would be unclear as to whether changes in the monitored maintenance parameters were due to deterioration in equipment condition or to changes in upstream process conditions.

The system 100 may include a local area network (LAN) 102 that is connectable to other networks 104, including other LANs or portions of the Internet or an intranet, through a router 106 or similar mechanism. One example of such a LAN 102 may be a process control network to which process control devices, such as process controller 114, and plant sensors 107 are connected. Process control networks are well known in the art and are used to automate industrial tasks. The network 104 may be a corporate computing network, including possible access to the Internet, to which other computers and computing devices physically removed from the process 101 are connected. In one embodiment, the LANs 102, 104 conform to Transmission Control Protocol/Internet Protocol (TCP/IP) and Common Object Request Broker Architecture (COBRA) industry standards. In alternative embodiments, the LANs 102, 104 may conform to other network standards, including, but not limited to, the International Standards Organization's Open Systems Interconnection, IBM's SNA®, Novell's Netware®, and Banyon VINES®.

The system 100 includes a server 108 that is connected by network signal lines to one or more clients 112. In an exemplary embodiment the server 108 includes a UNIX or Windows NT-based operating system. The server 108 and clients 112 may be uniprocessor or multiprocessor machines, and may otherwise be configured in a wide variety of ways to operate consistent with the teachings of the present invention. The server 108 and clients 112 each include an addressable storage medium such as random access memory and may further include a nonvolatile storage medium such as a magnetic or an optical disk.

The system 100 also includes a storage medium 110 that is connected to the process control network 102 or corporate control network 104. In the exemplary embodiment the storage medium 110 may be configured as a database from which data can be both stored and retrieved. The storage medium 110 is accessible by devices, such as servers, clients, process controllers, and the like, connected to the process control network 102 or the corporate control network 104.

Suitable servers 108 and clients 112 include, without limitation, personal computers, laptops, and workstations. The signal lines may include twisted pair, coaxial, telephone lines, optical fiber cables, modulated AC power lines, satellites, and other data transmission media known to those of skill in the art. A given computer may function both as a server 108 and as a client 112. Alternatively, the server 108 may be connected to the other network 104 different from the LAN 102. Although particular computer systems and network components are shown, those of skill in the art will appreciate that the present invention also works with a variety of other networks and components.

Figure 2:
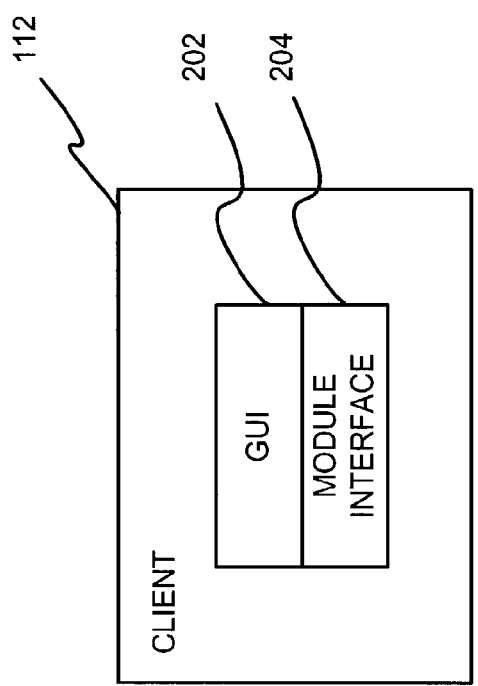
FIG. 2 illustrates an architecture of a client unit which may be used with an exemplary embodiment of the present invention.

FIG. 2 illustrates an architecture of the client 112 which may be used with one preferred embodiment of the present invention. The client 112 provides access to the functionality provided by the server 108. The client 112 includes a GUI 202 and an optional module interface 204. The Graphical User Interface (GUI) 202 is used to build and specify model applications. One embodiment of the GUI 202 incorporates user interface features such as tree views, drag-and-drop functionality, and tabbed windows to enhance the intuitiveness and usability of the interface. The GUI 202 further enables access to other encapsulated GUIs such as process unit GUIs, non-process unit GUIs, and stream GUIs as described below.

Access to the GUI 202, as well as other architectural objects to be discussed in detail below, are through the optional module interface 204. In one embodiment, the module interface 204 is the Interface Definition Language (IDL) as specified in the CORBA/IIOP 2.2 specification. In one embodiment, the module interface 204 provides a uniform interface to the architectural objects, such as the GUI 202. The module interface 204 allows the actual implementation of the architectural objects, such as the GUI 202, to be independent of the surrounding architecture, such as the operating system and network technology. One of ordinary skill in the art will recognize that the module interface 204 may conform to other standards, or even be non-existent.

Figure 3:
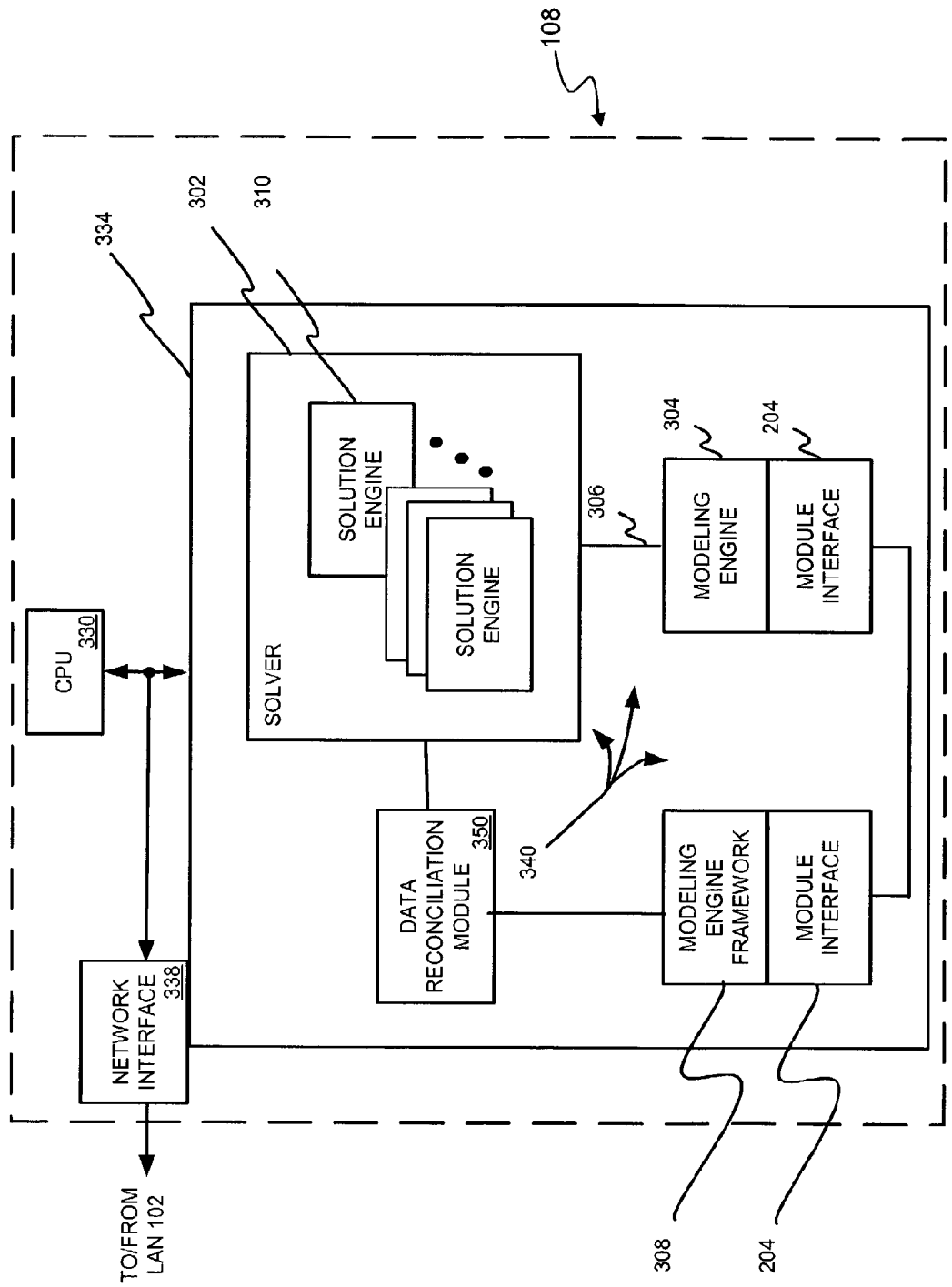
FIG. 3 is a block diagram representative of the internal architecture of a server unit operative in accordance with the present invention.

FIG. 3 is a block diagram representative of the internal architecture of the server 108, which may be physically implemented using a standard configuration of hardware elements. As shown, the server 108 includes a CPU 330, a memory 334, and a network interface 338 operatively connected to the LAN 102. The memory 334 stores a standard communication program (not shown) to realize standard network communications via the LAN 102. The memory 334 further stores a solver 302 accessible by a modeling engine 304 through an access mechanism 306, and a modeling engine framework 308. The solver, modeling engine 304, and modeling engine framework 308 collectively comprise a simulation module 340, the operation of which is further described below. The optional module interface 204 provides uniform access to, and implementation independence and modularity for both the modeling engine 304 and the modeling engine framework 308. As is discussed below, the memory 334 also stores a data reconciliation module 350 containing a set of computer programs which, when executed, effect certain mass and energy balance reconciliation processes of the present invention.

The modeling engine 304 provides an environment for building and solving process models. The solver 302 provides a solution algorithm for solving a process model generated by the underlying modeling engine 304. In one embodiment, the solver 302 may contain one or more solution engines 310 which are used in solving different process models. For example, one solver that may be used is Opera, a solver available from the Simulation Sciences unit of Invensys Systems, Inc. as part of the ROMeo System. In one embodiment, the solver 302 comprises a solution engine 310 implemented as a generalized matrix solver utilizing a Harwell subroutines. As is well known in the art, the Harwell library is an application independent library of mathematical subroutines used in solving complex mathematical equation sets. In one embodiment, the access mechanism 306 is specific to the solution engine 310 contained in the solver 302 and the modeling engine 304 used in generating the math model.

The modeling engine framework 308 is an interpretive layer providing user-friendly access to the modeling engine 304. In one embodiment, the modeling engine framework 308, working in conjunction with the GUI 202, provides a user the ability to add new unit models, modify existing unit models, and generally interact with the modeling engine 304 without having to know the specifics of the modeling engine 304.

Figure 4:
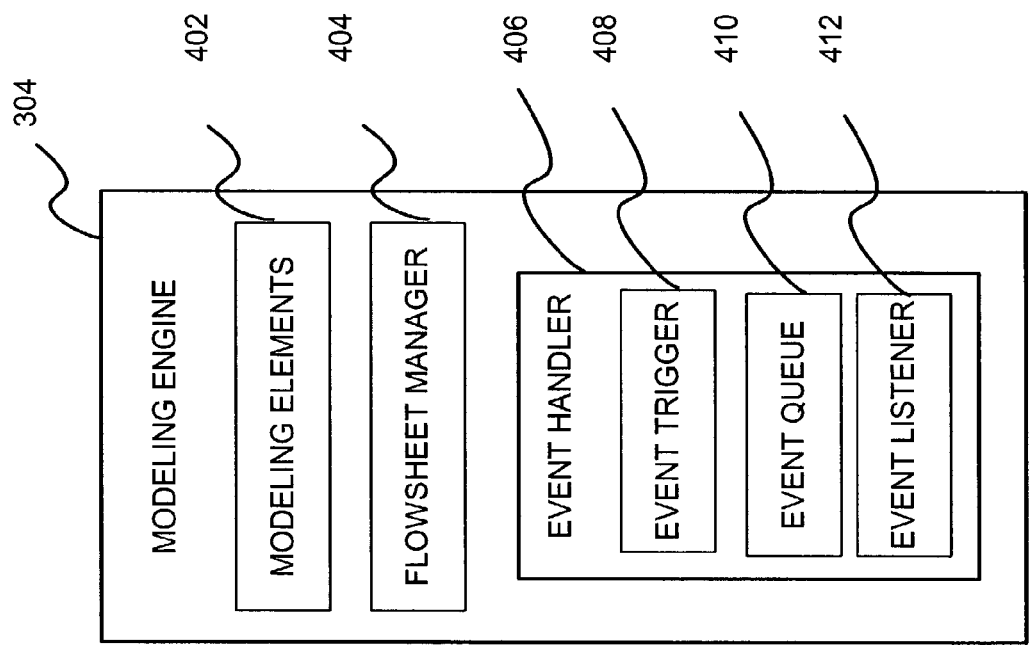
FIG. 4 further illustrates certain additional components comprising a modeling engine of a simulation module.

FIG. 4 further illustrates certain additional components comprising the modeling engine 304 in one preferred embodiment. The modeling engine 304 comprises model elements 402, a flowsheet manager 404, and an event handler 406. The model elements 402 include individual units and streams from which a user builds a flowsheet model. For example, a pump is a unit that the user may include in a flowsheet model.

A unit represents a device that may be found in a process plant. The unit may be a process or an on-process unit. A process unit is an item of operating hardware such as a heat exchanger, a compressor, an expander, a firebox, a pipe, a splitter, a pump, and the like. As mentioned above, each unit is represented by a generally nonlinear model characterized by one or more parameters. Each parameter of a given model will typically pertain to mass or energy transfer characteristics of the equipment unit represented by the model. Some or all of these parameters may be considered maintenance parameters, and will generally be considered as such to the extent that monitoring the changes in their respective values over time may enable inference of the condition of the applicable unit of equipment.

A non-process unit is something other than an item of operating hardware. For example, a non-process unit may be a penalty. A penalty unit assigns a progressively increasing weight to a measured output temperature value beyond the optimum output temperature. For example, the penalty unit may account for the increased cleanup costs associated with operating the furnace at a higher than optimum output temperature. Another example of a non-process unit may be a measurement from measuring devices such as flow meters, thermocouples, and pressure gauges.

In one embodiment, each unit typically has one or more entry or exit ports and is associated with a model. The model is a collection of variables and equations, collectively known as a calculation block. A unit model represents the operation of the unit in terms of its associated calculation block. As an example, an equation for a measurement unit may be:

ModelVariable−Scan−Offset==0 where ModelVariable is a calculated value, Scan is a measured value, and Offset is the difference between ModelVariable and Scan. The above equation contains three variables: ModelVariable, Scan and Offset.

As another example, the equations for a pump unit may be:

PresRise−Product:Pres+Feed:Pres==0, and

Head*GravConst*Feed:Prop["WtDens"]1000*PresRise==0 where PresRise is a rise in pressure, Product:Pres is an output pressure, Feed:Pres is an input pressure, Head is a liquid height within a tank connected to the pump, GravConst is the gravity constant, Feed:Prop["WtDens"] is a weight density of the liquid in the tank, and the PresRise is a rise in pressure of the pump. In the first equation, PresRise, Prod:Pres, and Feed:Pres are variables. In the second equation, Head, Feed:Prop ["WtDens"], and PresRise are variables. GravConst is a parameter, and thus requires a value to be assigned before the equation may be solved.

A stream is used to connect a unit's entry or exit port to another unit's exit or entry port respectively. Furthermore, a feed stream is connected to the unit's entry port, whereas a product stream is connected to the unit's exit port. A stream model may have associated equations and variables. For example, a simplified stream model may be represented as follows:

$y=ax+b$ where "y" is a measurement that is allowed to assume values within a predefined range, and "x", "a" and "b" are parameters representative of equipment condition (i.e., "a" and "b" will generally change over time due to equipment wear), and "x" is a calculated value. During the reconciliation operation, the values of "y", "a" and "b" and similar values within all other equipment models of the applicable process are allowed to change until the overall process model reflects that mass and energy balance has been achieved throughout the process.

In one exemplary embodiment, multi-dimensional data structures are used to store individual units and streams, and their associated variables and equations. The data structures may also store other information such as, but not limited to, the type of unit or stream, whether a variable requires a user-provided value, the variable's lower bound, upper bound, solution value, or status. One of ordinary skill in the art will recognize that the data structures may be in the form of an array, linked list, or as elements within other data structures.

The flowsheet manager 404 provides access to instances of unit models, stream models, and other information associated with a flowsheet model. In one embodiment, the information associated with a flowsheet model may be stored in the storage medium 110. Preferably, the storage medium 110 stores at least one flowsheet model, including an equation, of an actual plant process. The flowsheet manager 404 may then communicate with the storage medium 110 to provide a user access to the information contained in the storage medium 110 in a manageable format. Further details regarding creation, modification and alteration of flowsheet models are provided in, for example, copending U.S. patent application Ser. No. 09/193,414, filed Nov. 17, 1998 and entitled INTERACTIVE PROCESS MODELING SYSTEM; U.S. Pat. No. 6,442,515, which is entitled PROCESS MODEL GENERATION INDEPENDENT OF APPLICATION MODE; and U.S. Pat. No. 6,323,882, which is entitled METHOD AND SYSTEMS FOR A GRAPHICAL REAL TIME FLOW TASK SCHEDULER, each of which is hereby incorporated by reference in its entirety.

Figure 5:
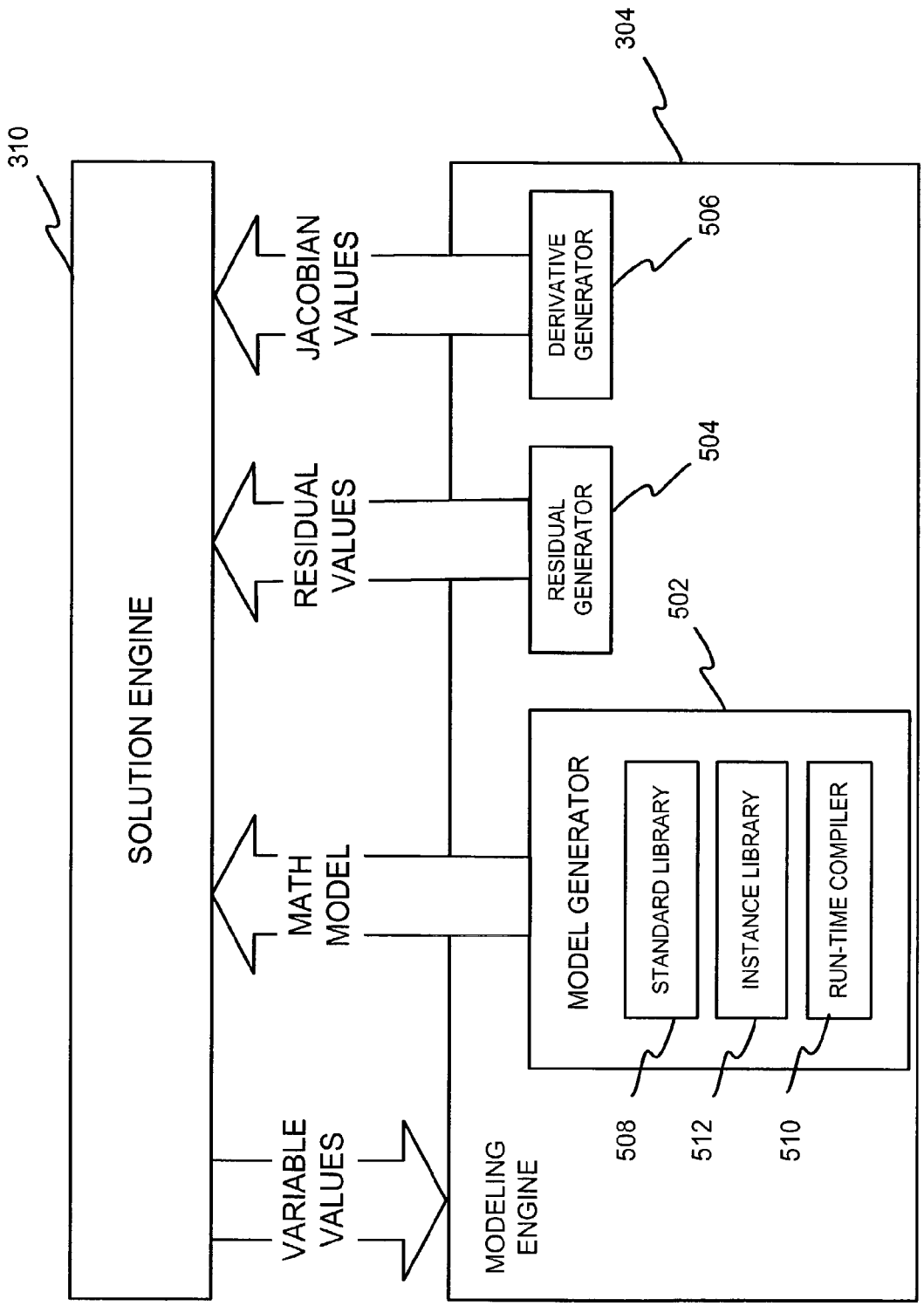
FIG. 5 further illustrates one embodiment of the interaction between the modeling engine and a solution engine of the simulation module.

FIG. 5 further illustrates one embodiment of the interaction between the modeling engine 304 and the solution engine 310 of the simulation module 340. As is described in the above copending patent applications, the modeling engine 304 additionally comprises a model generator 502, a residual generator 504, and a derivative generator 506. The modeling engine 304 provides the open form of model equations to the solution engine 310. The solution engine 310, in turn, solves the equations. In an alternative embodiment, a closed form of the model equations may be provided by the modeling engine 304.

The model generator 502 creates a math model of the flowsheet for input to the solution engine 310. In the exemplary embodiment, the math model is a large set of equations and variables that comprehensively models the entire process 101. The math model will typically be in the form of a matrix which represents the equations contained in the flowsheet model in the form $f(x)=0$. Standard equations and variables associated with a corresponding unit model or stream model are provided in a previously compiled standard library 508. The equations may comprise mass, material, equilibrium, thermodynamic, and physical property related equations applicable to the process 101 in its entirety.

As is described below, the data reconciliation module 350 uses the math model and measurements from the sensors 107 in computing reconciled model parameters and sensor measurements capable of being used to effect closed loop control of the process 101. This computation is effected by adjusting (within the range of sensor accuracy) the measurements from the sensors 107 and the parameters of the math model until a solution is determined.

Again, in the exemplary embodiment the math model reflects mass and energy balance throughout the process 101 in its entirety; that is, the math model takes into account substantially all of the mass and energy associated with the process 101. This is effected in part by specifying the input and output relationships with respect to mass and energy for each equipment model. In addition, equality constraints are applied as appropriate to those models representative of equipment units between which mass/energy is transferred. As a consequence, the data reconciliation module 1022 operates upon a set of equations which characterize mass and energy flow for the entire process 101. This differs from conventional approaches, in which mass and/or energy balance is computed on only a localized basis.

The exemplary embodiment also contemplates that the accuracy of every sensor 101 used to measure parameters associated with the process 101 is characterized. This characterization generally involves determining the variance of each sensor 107, which reflects the range over which the value of the variable measured by the sensor 107 can vary during the reconciliation process and still be consistent with expected calibration accuracy. Determination of the variance of each sensor 107 thus facilitates identification faulty or malfunctioning sensors, since an adjustment in the value of the sensor during the reconciliation process outside of such variance indicates that the sensor has been providing an erroneous measurement value. Similarly, variances are ascribed to one or more parameters associated with each model element 402 representative of a unit of equipment or characteristic of the process 101. If adjustments made to such parameters during the reconciliation process result in ostensible operation of a unit of equipment outside of an expected range, then there exists a substantial likelihood of significant equipment degradation or malfunction. The present invention thus advantageously facilitates identification of faulty or inoperative units of equipment contributing to operation of the process 101.

Figure 6A:
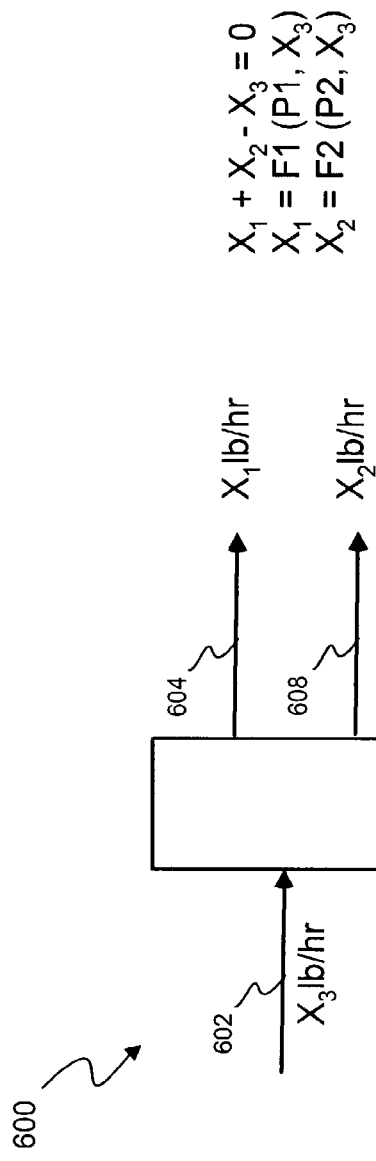
FIGS. 6-9 illustratively represent a mathematical basis for a data reconciliation operation performed in accordance with one aspect of the present invention.
Figure 6B:
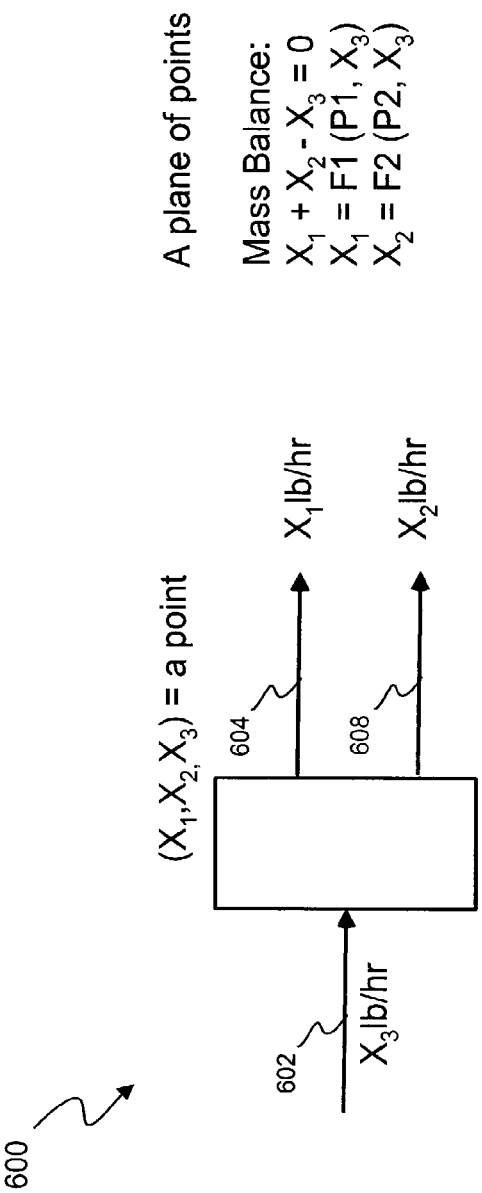

FIGS. 6-9 provide an illustrative representation of a mathematical basis for a data reconciliation process effected in accordance with the present invention. Turning to FIG. 6, there is shown a simplified flow system 600 having an input flow stream 602 designated as relating in what follows to a mathematical variable X3. As shown, the simplified flow system 600 includes first and second output flow streams 604 and 608 designated as relating to the mathematical variables X1 and X2, respectively. The discussion below is intended to elucidate a number of mathematical concepts underlying various features of the present invention.

Although the flow streams represented by FIG. 6 will often be associated with mass or matter in "bulk", the streams could also representative of a thermodynamic quantity (e.g., energy) or a specific component of a material being processed. As shown, the first flow stream 602 is separated into the second and third flow streams 604 and 608 at a process node 612. Depending upon the context of the flow system 600, the node 612 may correspond to various physical realizations (e.g., a three-way connector). Although the node 612 may operate to maintain a substantially constant rate of flow, in a more complex arrangement the node 612 may be representative of an overall process effected by a plurality of components. In the latter case, the sum of the flows of the output flow streams 604 and 608 may not equilibrate with the flow of the input flow stream as frequently as in simpler manifestations of the node 612.

In the case when the node 612 is implemented straightforwardly to partition the input flow stream 602, conservation of mass requires that $$X_1 + X_2 - X_3 = 0 \qquad \text{Equation (1)}$$

In order to account for the possibility of a nonlinear relationship between the input flow stream 602 and the output flow streams 604 and 608, the output flow streams 604 and 608 may be expressed as function of parameters P1 and P2 as follows:

$$X_1 = F1(P1, X_3) \qquad \text{Equation (2)}$$

$$X_2 = F2(P2, X_3) \qquad \text{Equation (3)}$$

In equations (2) and (3) the functions F1 and F2 could, for example, represent valve curves dependent upon the parameters P1 and P2.

Referring again to Equation (1), when actual measured values $X'_1$, $X'_2$, and $X'_3$ of the three flows $X_1$, $X_2$, and $X_3$ are utilized it is likely that mass will not be conserved and Equation (1) will not be satisfied. In geometric terms, the measurements $X'_1$, $X'_2$, and $X'_3$ may be considered to define a point in space while equation (1) may be viewed as defining a planar surface. That is, all sets of flows $X_1$, $X_2$, and $X_3$ in the plane satisfy equation (1). Any given set of measured flows values $X'_1$, $X'_2$, and $X'_3$ will generally not conserve mass, and hence will generally spatially correspond to a point outside of the plane.

Figure 7:
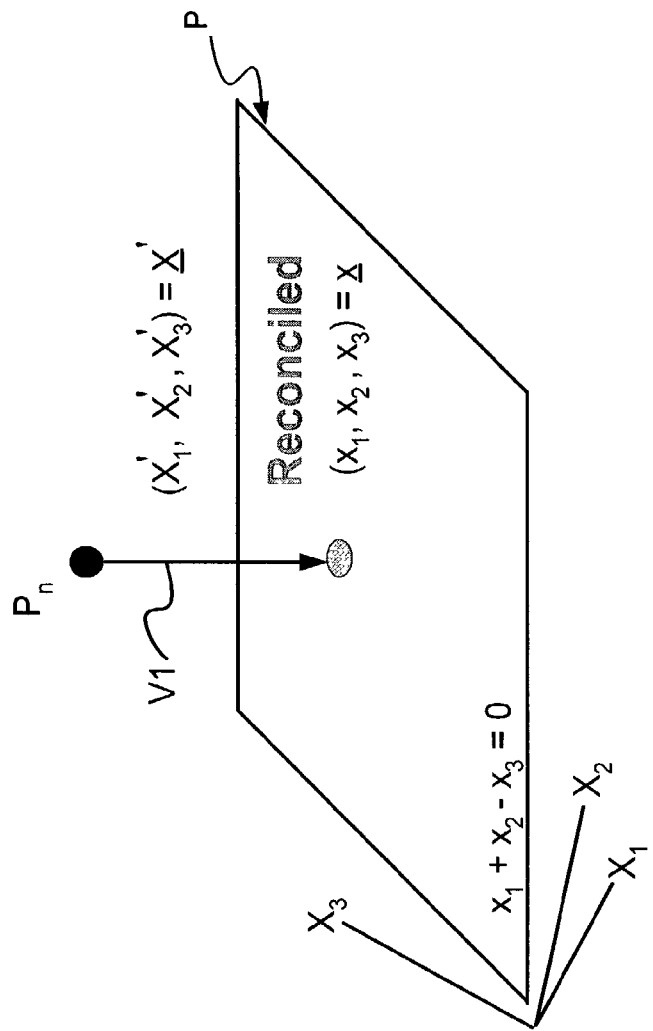

Turning now to FIG. 7, the process of data reconciliation in accordance with the present invention is illustratively represented in geometric terms. As shown, a point $P_N$ defined by a measured set of flows $X'_1$, $X'_2$, and $X'_3$ is translated from a location out of a plane P of flow values $X_1$, $X_2$, and $X_3$ satisfying equation (1). Although in the context of FIG. 7 this translation is effected by simply adjusting the parameters the values of the measured flows $X'_1$, $X'_2$, and $X'_3$, in an exemplary embodiment both the parameters P1 and P2 of Equations (2) and (3) and the values of the measured flows $X'_1$, $X'_2$, and $X'_3$ are adjusted in order to move the point $P_N$ into the plane P. Once point $P_N$ has been translated onto the plane P, it may be characterized as having been reconciled (i.e., the measured values $X'_1$, $X'_2$, and $X'_3$ and parameters P1 and P2 have been modified to the extent necessary to satisfy Equations (1)-(3)). Mathematically, this reconciliation process may be equivalently represented as the determination of an offset reconciliation vector V1 and its addition to the vector extending between the origin and the point $P_N$.

Figure 8:
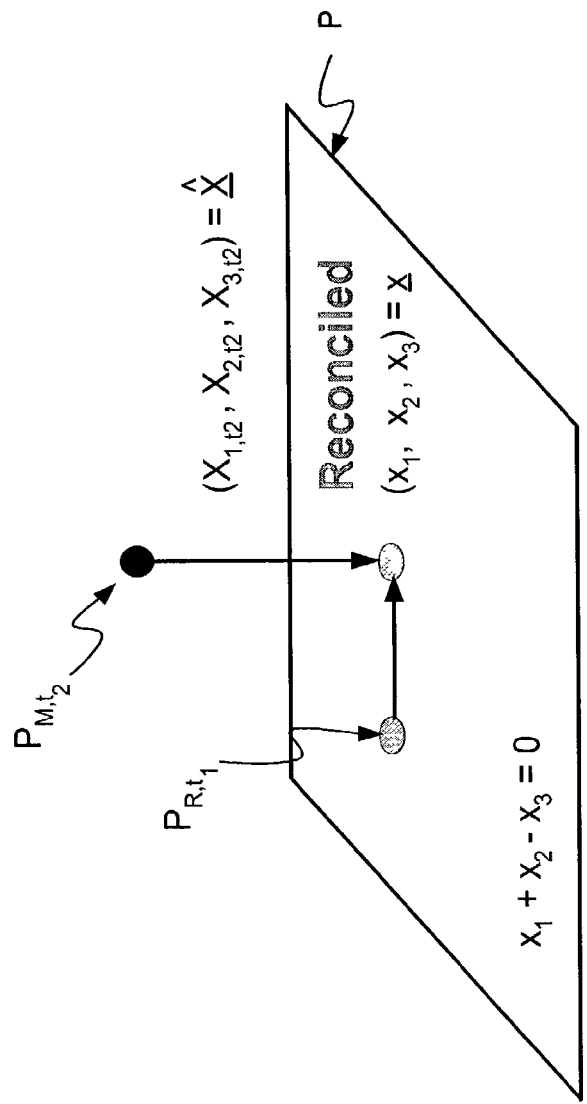

FIG. 8 represents the manner in which a set of measured flow values may be reconciled either through a least squares minimization process in which both the parameters P1 and P2 and measured flow values are themselves adjusted. As shown, at a time $t_1$ a set of reconciled flows may exist which define a point $P_{R,t1}$ on the plane P of flow values satisfying equation (1). At a subsequent point in time ($t_2$), a set of measured flows $X'_{1,t2}$, $X'_{2,t2}$, and $X'_{3,t2}$ are seen to define a point $P_{M,t2}$ off of the plane P. In accordance with the invention, the values of the parameters P1 and P2 and the values of the measured flows $X'_{1,t2}$, $X'_{2,t2}$, and $X'_{3,t2}$ are each modified to extent of the uncertainty inhering in each such value until the point $P_{M,t2}$ is "translated" to the plane P. This reconciliation may be effected in accordance with the least-squares expression of equation (4), which in the exemplary implementation is minimized through perturbation of both measured values X' and model parameters:

$$\min_{\substack{\text{Tuning} \\ \text{Parameters} \\ \text{\& Measured} \\ \text{Values}}} \|\text{Offset}\|^2 = \|\underline{X}' - \underline{x}\|^2 \qquad \text{Equation (4)}$$

$$= \frac{1}{\sigma_1^2}(X'_1 - x_1)^2 + \frac{1}{\sigma_2^2}(X'_2 - x_2)^2 + \frac{1}{\sigma_3^2}(X'_3 - x_3)^2$$

where the weighting factor, σ, present in Equation (4) takes into account both the uncertainty and inaccuracy in the measured values X' of the sensors 107 and in the parameters (i.e., P1, P2 of Equations (2) and (3)) associated with the model elements 402. In particular, uncertainty in the readings from the sensors affects the value of X' within each offset term, while uncertainty in the values of the parameters affects the value of x within each offset term. The least squares objective function illustrated of Equation (4) is formulated such that each individual offset (i.e., $(X'_1-x_1)^2$, $(X'_2-x_2)^2$, $(X'_3-x_3)^2$) is multiplied by the reciprocal of the standard deviation (or variance) obtained during steady state conditions from a historical set of data for the relevant measured data value. The approach exemplified by Equation (4) aids in reducing the predictable noise effects introduced by the uncertainty and/or inaccuracy inherent with the sensors 107 or equipment maintenance parameters.

In the exemplary embodiment, Equation (4) is solved under conditions of "steady state" operation. "Steady state operation" essentially corresponds to the case where (1) a process is substantially regular and uniform in its operation over a given time interval, (2) momentum, mass, and energy entities flowing into the process are substantially equal to the momentum, mass, and energy entities flowing out of the process, and (3) momentum, mass, and energy do not otherwise accumulate within the process unless stipulated by the relevant equipment model.

Figure 9:
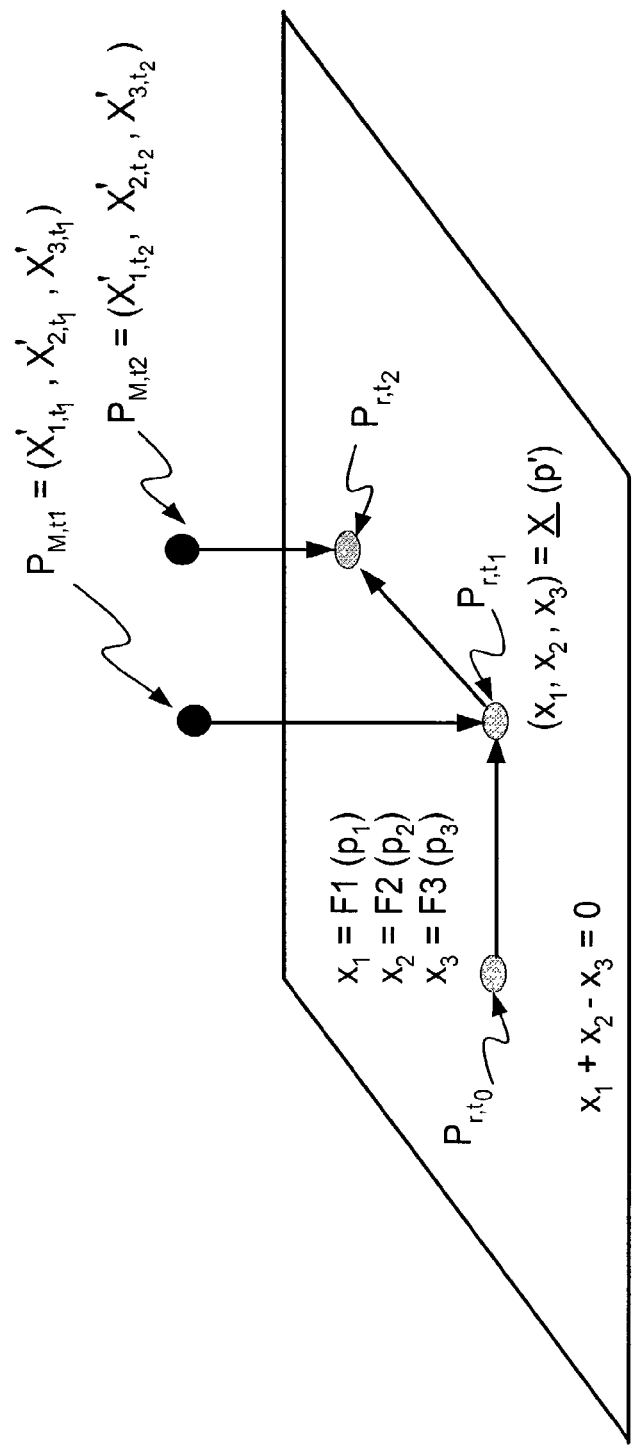

FIG. 9 illustratively represents a process of successive reconciliation in accordance with the present invention. As shown, at a time $t_0$ a set of reconciled flows $(x_1, x_2, x_3)$ may exist which define a point $P_{R,t0}$ on a plane P1 of flow values satisfying equation (1). That is, $$x_1+x_2=X_3 \quad \text{Equation (5)}$$

where, $$x_1=F1(p_1) \quad \text{Equation (6)}$$

$$x_2=F1(p_2) \quad \text{Equation (7)}$$

$$x_3=F1(p_3) \quad \text{Equation (8)}$$

At a subsequent point in time $(t_1)$, a set of measured flows $X'_{1,t1}$, $X'_{2,t1}$, and $X'_{3,t1}$ are seen to define a point $P_{M,t1}$ off of the plane P1. Consistent with the invention, the values of the parameters $p_1$, $p_2$ and $p_3$, as well as the values of the measured flows $X'_{1,t1}$, $X'_{2,t1}$, and $X'_{3,t21}$ are modified by the simulation module 340 to the extent of their respective uncertainties until the point $P_{M,t1}$ defines a point $(P_{R,t1})$ on the plane P1. As noted above, this reconciliation may be effected in accordance with the least-squares expression of equation (4). As a consequence of this reconciliation, the model parameters $p_1$, $p_2$ and $p_3$ are incremented by the quantities $dp_1$, $dp_2$ and $dp_3$, respectively, thereby yielding modified model parameters as of time $t_1$:

$$p'_1=p_1+dp_1$$

$$p'_2=p_2+dp_2$$

$$p'_3=p_3+dp_3$$

As shown in FIG. 9, at later point in time $(t_2)$ a set of measured flows $X'_{1,t2}$, $X'_{2,t2}$, and $X'_{3,t2}$ are seen to define a point $P_{M,t2}$ off of the plane P1. The values of the parameters $p'_1$, $p'_2$ and $p'_3$, as well as the values of the measured flows $X'_{1,t2}$, $X'_{2,t2}$, and $X'_{3,t22}$ are then modified by the simulation module 340 as described above until the point $P_{M,t2}$ defines a point $(P_{R,t2})$ on the plane P1.

In accordance with one aspect of the invention, the behavior of the parameters $p_1$, $p_2$, and $p_3$ over time (e.g., days and months) can be monitored in order to detect equipment wear and enable anticipation of probable equipment failure. In particular, certain equipment parameters are identified as maintenance parameters and set as "free variables" to be monitored over time. The observed changes in these maintenance parameters may then provide an indication of equipment deterioration or imminent failure. In general, the maintenance parameters will be selected from among those equipment model parameters indicative of the capability of a given equipment unit to conduct mass and energy as intended. Significant changes in the values of such parameters as a result of the reconciliation process will generally be indicative of an adverse change in the state of the applicable equipment.

Figure 10:
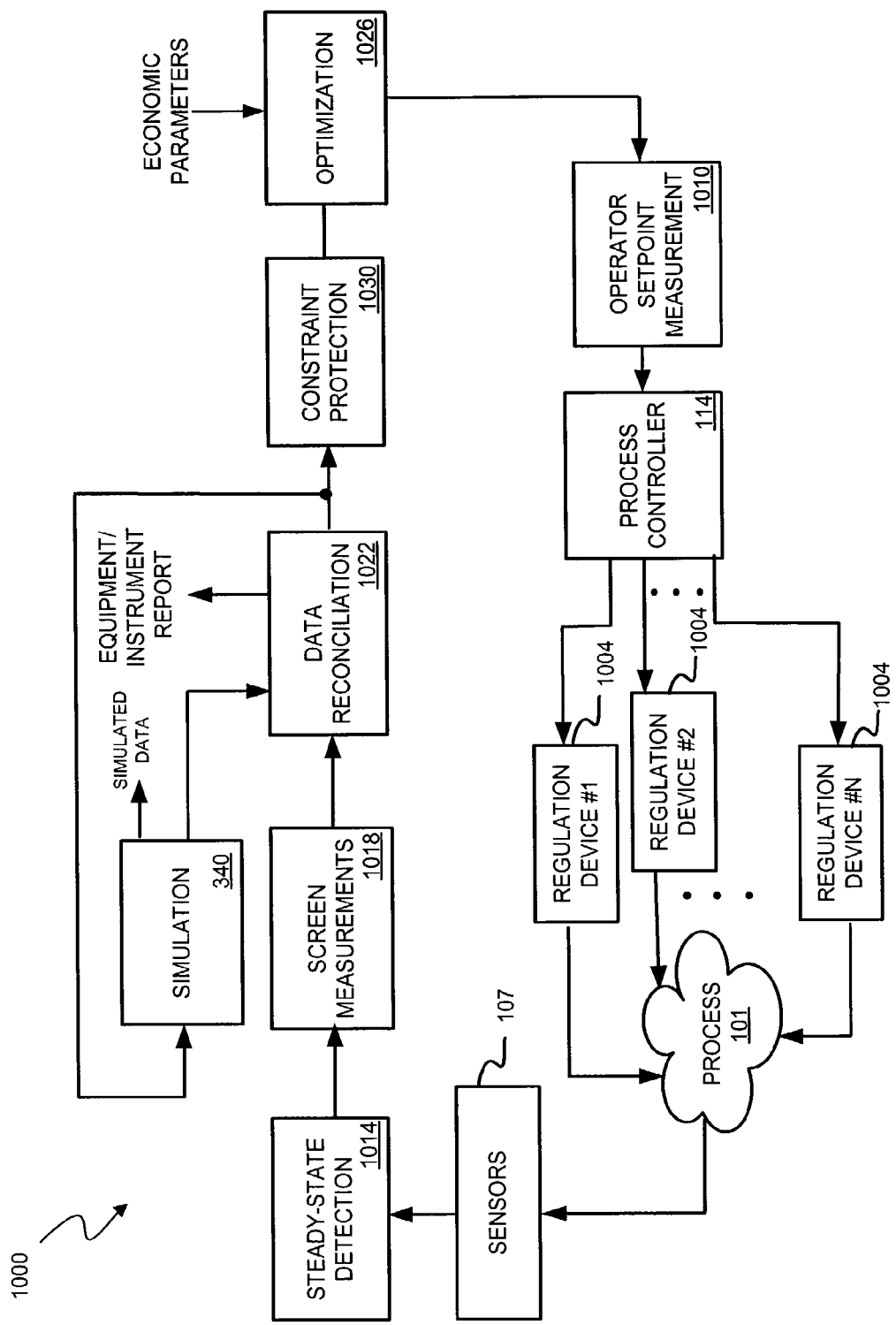
FIG. 10 depicts a relationship of the data reconciliation module to other system functionality within a general process control system.

FIG. 10 depicts the relationship of the data reconciliation module 1022 to other system functionality within a general process control system 1000. In specific embodiments the control system 1000 may be utilized in the control of, for example, power generation processes, chemical processes, refineries and transportation systems. The material operated upon by the process can often be treated as a fluid, which are moved within the process in streams. A process is typically comprised of multiple elements connected by way of streams. Each element effects a certain function (e.g., reaction, distillation, or heat exchange).

Referring to FIG. 10, the data reconciliation module 1022 operates together in a system 1000 with a set of regulation devices 1004 under the control of the process controller 114. The regulation devices 1004 and the process controller 114 collectively control equipment-related variables such as pressure, temperature, level, and flow (commonly known as "PTLF" variables) in order to maintain the process 101 in a certain desired state. In particular, the regulation devices 1004 respond to output signals from the process controller 114 to produce an accordingly predetermined operation representing the strength of the output signal. Both the process controller 114 and PTLF-based regulation devices 1004 are familiar to those skilled in the art. The values of various PTLF variables may be adjusted in an operator setpoint adjustment operation 1010 in order to move the equipment involved in the process 101 to another stationary state.

In the controlled system 1000 of FIG. 10, various aspects of the process 101 are monitored by the sensors 107. To this end, the sensors 107 produce output signals representative of the values of various PTLF or other characteristics of the process 101. The output signals from the sensors 107 correspond to process variables operated upon by the system 1000. Based upon these output signals, a steady state detection operation 1014 determines when the process 101 enters a steady state condition (described above). Once a steady-state condition has been achieved, the raw sensor output signals are screened against the upper and lower limits defining predefined acceptable ranges in a screen measurements operation 1018. In a particular implementation default values may be substituted for those raw sensor signals discarded during the screen measurements operation 1018. The remaining sensor output signals, and any substituted default signals, are then processed in the data reconciliation module 1022.

The data reconciliation module 1022 utilizes the sensor signals from the screen measurements module 1018 and predicted process data provided by the simulation module 340 in creating reconciled measurement signals for utilization during a subsequent optimization operation 1026. The predicted operational data (e.g., pressure, level, temperature, and flow) created by the simulation module 340 is generated by the solver 302 on the basis of the model of the process 101 established by the modeling engine 304. Prior to performing the optimization operation 1026, the reconciled measurement data generated by the reconciliation module 1022 is communicated to a constraint projection module 1030. The reconciliation operation effected by the reconciliation module 1022 results in creation of an improved set of process measurement data for use during the optimization operation 1026, thereby reducing the likelihood of inappropriate control of the process 101.

Figure 11:
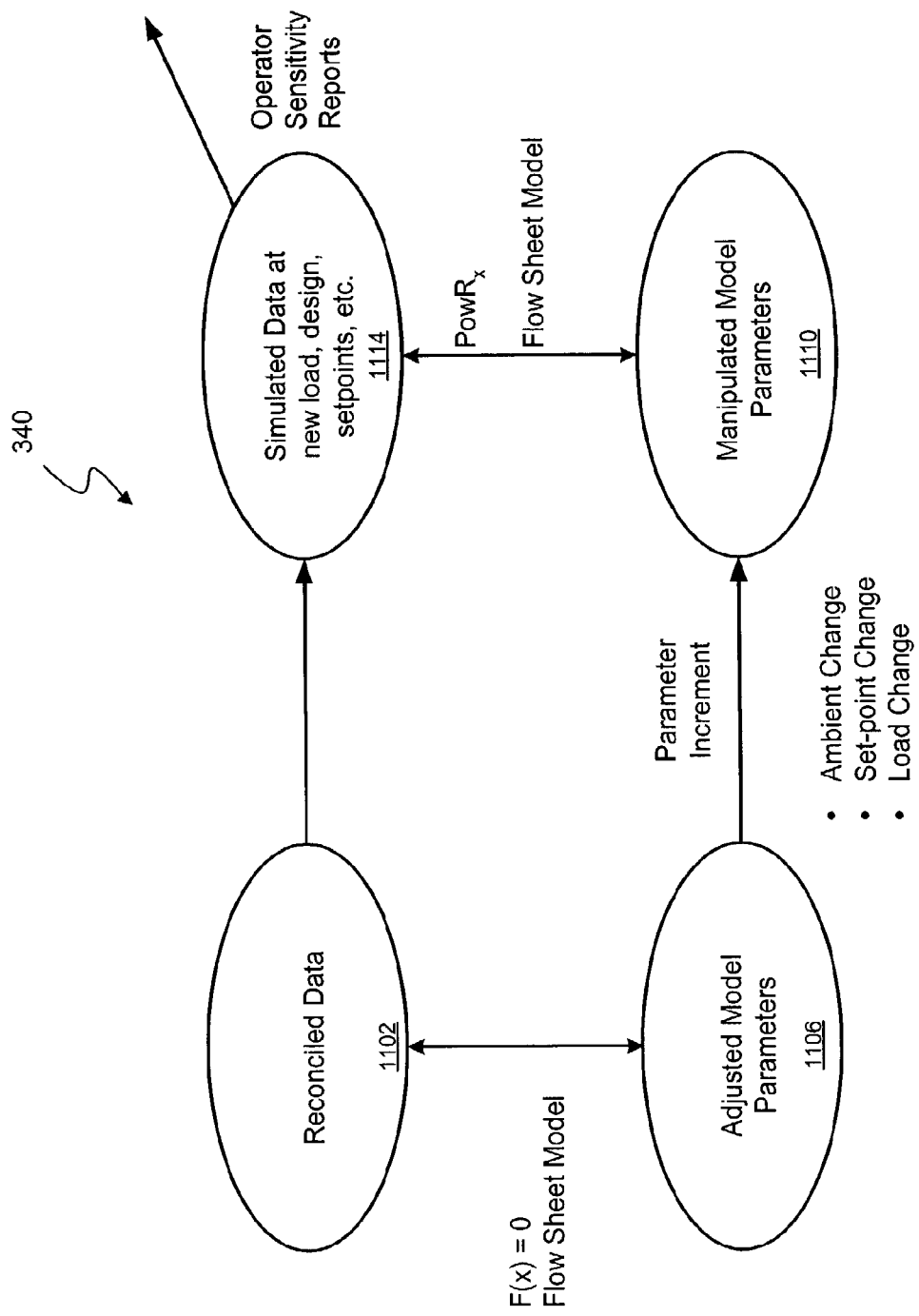
FIG. 11 provides a high-level illustrative representation of the operation of a simulation module.

FIG. 11 provides a high-level illustrative representation of the operation of the simulation module 340. As is illustrated by FIG. 11, the simulation module 340 may also be utilized to simulate the state of the process 101 in response to varying load conditions and setpoints of the regulation devices 1004. As mentioned above, in the exemplary embodiment the data reconciliation module 1022 provides updated model parameters and data to the simulation module 340 at the conclusion of each data reconciliation operation (step 1102 of FIG. 11). This is done in order to cause the simulation model 340 to more accurately predict the characteristics of the process 101 measured by the sensors 107. Periodic calibration of the model parameters (step 1106) compensates for changes in the behavior of the process 101 relative to the simulated operation computed by the simulation module 340. This enables the simulation results produced by the simulation model 340 to be refined as its model parameters are periodically adjusted in connection with each iteration of the data reconciliation module 1022. Various "what if" scenarios may then be investigated by adjusting parameters (e.g., ambient conditions, set-point, and process load) associated with the simulation model 340 (step 1110). In particular, simulated data under these new ambient conditions and/or set points is then produced by the simulation model 340 and may be reported to operators of the process 101 (step 1114).

Referring again to FIG. 10, the reconciled process measurement data is processed during the optimization operation 1026 upon being furnished by the constraint projection module 1030.

In the exemplary embodiment the optimization operation 1026 is also comprised of the modeling engine 304 and the solver 302. That is, the mass and energy balance equations incorporated within the modeling engine 304 may also be used for optimization after undergoing the reconciliation effected by the data reconciliation module 1022.

Figure 12:
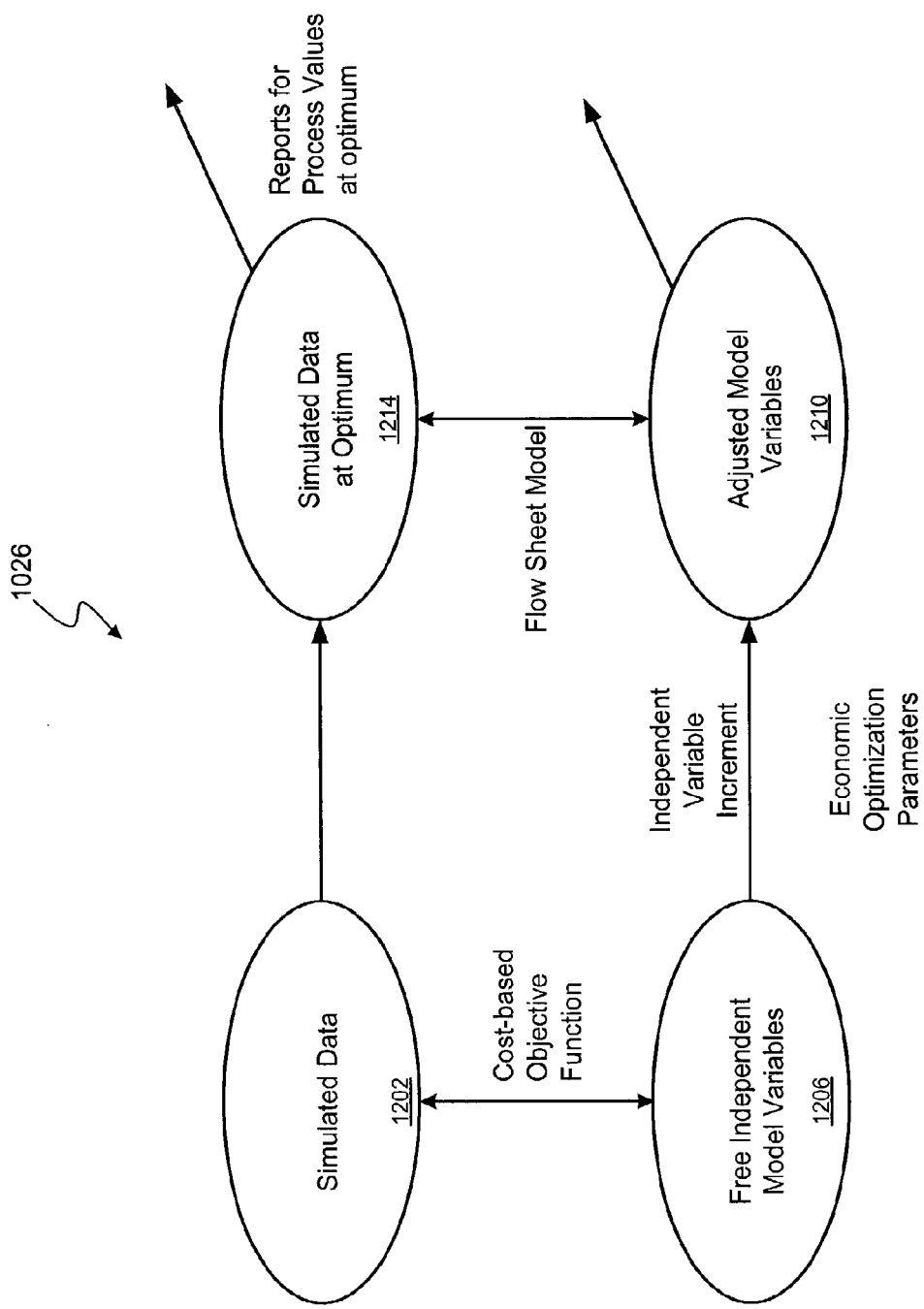
FIG. 12 provides a high-level illustrative representation of the operation of an optimization module.

FIG. 12 provides a high-level illustrative representation of an exemplary optimization operation 1026. In a step 1202, the variables of the applicable mass and energy balance equations are initialized with values generated during a prior iteration of the simulation module 340. A cost-based objective function is then formulated in which certain of these variables of interest are set to an independent state (step 1206). The independent variables are then incremented until the cost-based objective function is minimized (step 1210), and the operational results reported (step 1214).

Figure 13:
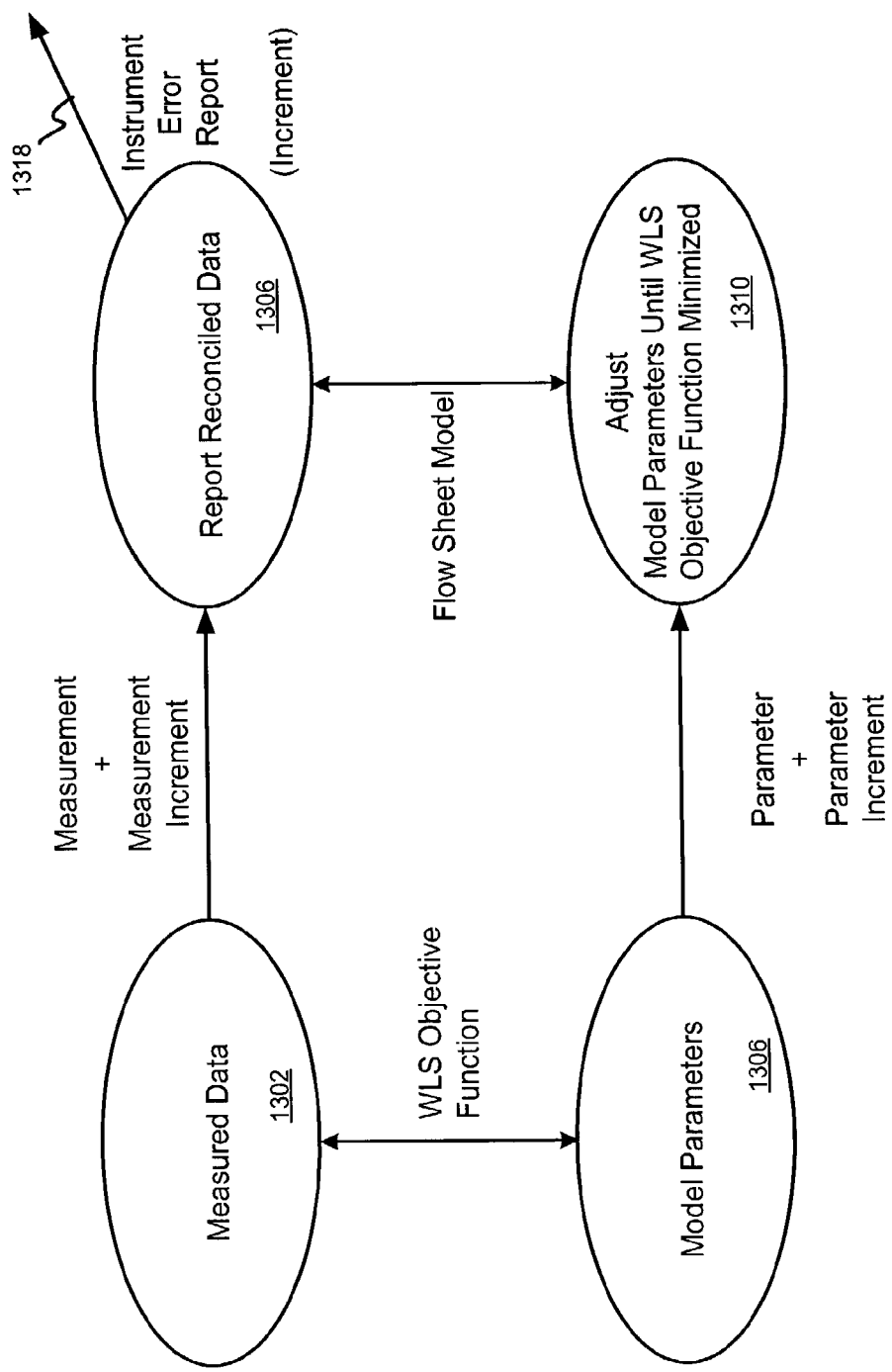
FIG. 13 illustratively represent one manner in which instrument errors and component degradation may be identified in accordance with the present invention.

FIG. 13 illustratively represent one manner in which instrument errors and component degradation may be identified through use of a data reconciliation module 1022 in accordance with the present invention. As is illustrated by FIG. 13, in a step 1302 the variables of the mass and energy balance equations included within the data reconciliation module 1022 are set in accordance with measurements of the parameters applicable to the monitored process. A weighted least squares (WLS) objective function is then formulated in which various parameters of the applicable equipment models (i.e., the equipment maintenance parameters) are set to a default state (step 1306). As mentioned above, the maintenance parameters associated with a particular unit of equipment will generally he selected to be parameters to reflective of the "health" or operational soundness of the equipment unit. By monitoring the change in such maintenance parameters over time it is thus possible to monitor the condition of selected units of equipment. In this way equipment maintenance or replacement may be scheduled when a change in the maintenance parameter(s) for a particular unit of equipment indicate that the equipment has experienced degradation or is likely to fail or malfunction. Referring again to FIG. 13, the parameters characterizing the monitored process (including the maintenance parameters) are incremented until the WLS objective function is minimized (step 1310), and the reconciled data reported (step 1314). In addition, an instrument error report may be generated when the values of one or more maintenance or other parameters associated with an equipment unit diverge from one or more corresponding predefined ranges (step 1318). Such a divergence could, for example, indicate either that the sensor responsible for measuring the parameter has malfunctioned or that condition of the applicable unit of equipment has significantly degraded.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following Claims and their equivalents define the scope of the invention.

What is claimed is:

1. A method of processing signals representative of a process effected by one or more units of equipment in operative communication through one or more resource flows therebetween, said method comprising:
    measuring flow rates of at least first and second of said resource flows in order to generate respective first and second measured resource flow signals;
    formulating a model of said process based upon conservation of a process parameter characterizing said first and second resource flows, said model including at least a first maintenance parameter, said first maintenance parameter being related to the operation of a first unit of equipment of the one or more units of equipment and indicative of the operational soundness of the first unit of equipment;
    adjusting a first value of said first measured resource flow signal, a second value of said second measured resource flow signal, and said first maintenance parameter such that said process parameter is conserved consistent with said model; and
    scheduling maintenance of the first unit of equipment based on the monitoring of the first maintenance parameter.

2. The method of claim 1 wherein said model is further based upon a second maintenance parameter, said adjusting including modifying a value of said second maintenance parameter.

3. The method of claim 1 wherein said adjusting includes minimizing a sum of squared difference values representative of error differentials in said first and second measured resource flow signals.

4. The method of claim 3 wherein a weighting factor is assigned to each of said squared difference values based upon accuracy of a corresponding sensor disposed to measure one of said flow rates.

5. The method of claim 1 wherein said adjusting includes modifying said first value so as to be outside of a predetermined range and associating an error condition with a first sensor disposed to generate said first measured resource flow signal.

6. The method of claim 1 wherein said adjusting includes adjusting said first value by a first offset, adjusting said second value by a second offset, and providing a user indication of said first offset and said second offset.

7. A computer-based system for processing signals representative of a process effected by one or more units of equipment in operative communication through one or more resource flows therebetween, said system comprising:
   a first sensor for measuring a flow rate of a first of said resource flows in order to generate a first measured resource flow signal;
   a second sensor for measuring a flow rate of a second of said resource flows in order to generate a second measured resource flow signal;
   a model generation module operative to formulate a model of said process based upon conservation of a process parameter characterizing said first and second resource flows, said model including at least a first maintenance parameter, said first maintenance parameter being related to the operation of a first unit of equipment of the one or more units of equipment and indicative of the operational soundness of the first unit of equipment;
   a reconciliation module operative to adjust a first value of said first measured resource flow signal, a second value of said second measured resource flow signal, and said first maintenance parameter such that said process parameter is conserved consistent with said model; and
   a maintenance module to schedule maintenance of the first unit of equipment based on the first maintenance parameter.

8. The system of claim 7 wherein said model is further based upon a second maintenance parameter, said reconciliation module modifying a value of said second maintenance parameter.

9. The system of claim 7 further including a third sensor for measuring an energy of said first of said resource flows in order to generate a first measured energy signal and a fourth sensor for measuring an energy of said second of said resource flows in order to generate a second measured energy signal, said reconciliation module adjusting a first value of said first measured energy signal and a second value of said second measured energy signal so as to conserve energy consistent with said model.

10. A method of processing signals representative of operation of a process involving one or more mass flows between a plurality of units of equipment, said method comprising:
   measuring flow rates of at least first and second of said mass flows in order to generate respective first and second measured mass flow signals;
   measuring first and second energies associated with said first and second mass flows in order to generate respective first and second measured energy signals;
   formulating a model of said process based upon mass and energy balance of said first and second resource flows and at least a first maintenance parameter, said first maintenance parameter being related to the operation of a first unit of equipment of the plurality of units of equipment and indicative of the operational soundness of the first unit of equipment;
   adjusting values of said first and second measured mass flow signals and said first and second measured energy signals and said first maintenance parameter such that said mass and energy balance is conserved consistent with said model; and
   monitoring the first maintenance parameter over time to detect equipment wear and anticipate equipment failure.

11. The method of claim 10 wherein said adjusting includes minimizing a sum of squared difference values representative of errors in said first and second measured mass flow signals.

12. The method of claim 10 wherein a weighting factor is assigned to each of said squared difference values based upon accuracy of a corresponding sensor disposed to measure one of said flow rates.

13. The method of claim 10 wherein said adjusting includes changing said values of said first and second measured mass flow signals by first and second offsets, respectively, and indicating that said first and second of said mass flows should be modified in accordance with said offsets.

14. A method for controlling operation of a plant process effected by one or more units of equipment in fluid communication through one or more mass flows, said method comprising:
   creating, using a graphical user interface, a sequence representative of a mathematical model of said plant process based upon conservation of mass and energy, said sequence including a plurality of tasks defining functions to be performed in controlling said plant process;
   measuring a flow rate of a first of said mass flows in order to generate a first measured mass flow signal;
   measuring a flow rate of a second of said mass flows in order to generate a second measured mass flow signal;
   modifying a first value of said first measured mass flow signal by a first offset, a second value of said second measured mass flow signal by a second offset, and a first maintenance parameter of said mathematical model by a third offset, said first maintenance parameter being related to the operation of a first unit of equipment of the one or more units of equipment and indicative of the operational soundness of the first unit of equipment;
   adjusting said first of said mass flows in accordance with said first offset; and
   monitoring the first maintenance parameter over time to detect equipment wear and anticipate equipment failure.

15. The method of claim 14 wherein said second offset is larger than a predetermined maximum offset, said method further including associating an error condition with a first sensor disposed to generate said second measured mass flow signal.

16. The method of claim 14 wherein said adjusting includes minimizing a sum of squared difference values representative of error differentials in said first and second measured mass flow signals.

17. The method of claim 16 wherein a weighting factor is assigned to each of said squared difference values based upon accuracy of a corresponding sensor disposed to measure one of said flow rates.

* * * * *